(12) United States Patent
Ren et al.

(10) Patent No.: US 8,731,478 B2
(45) Date of Patent: May 20, 2014

(54) METHOD FOR REPORTING CHANNEL STATE INFORMATION, METHOD FOR CHANNEL ESTIMATION, TERMINAL DEVICE, AND BASE STATION

(75) Inventors: Xiaotao Ren, Beijing (CN); Lei Wan, Beijing (CN); Zhiyu Yan, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 156 days.

(21) Appl. No.: 13/284,296

(22) Filed: Oct. 28, 2011

(65) Prior Publication Data
US 2012/0040622 A1    Feb. 16, 2012

Related U.S. Application Data

(63) Continuation of application No. PCT/JP2009/071608, filed on Apr. 30, 2009.

(51) Int. Cl.
*H04B 17/00* (2006.01)
(52) U.S. Cl.
USPC ............... 455/67.11; 455/507
(58) Field of Classification Search
CPC ..... H04B 7/0639; H04B 7/0632; H04B 7/024
USPC ...................................... 455/67.11
See application file for complete search history.

(56) References Cited

U.S. PATENT DOCUMENTS

| | | | |
|---|---|---|---|
| 8,503,555 B2 * | 8/2013 | Kim et al. | 375/260 |
| 2008/0212461 A1 | 9/2008 | Pande et al. | |
| 2009/0186645 A1 * | 7/2009 | Jaturong et al. | 455/507 |
| 2011/0299626 A1 | 12/2011 | Kim et al. | |

FOREIGN PATENT DOCUMENTS

| | | |
|---|---|---|
| CN | 101039137 A | 9/2007 |
| CN | 101212282 A | 7/2008 |
| CN | 101304300 A | 11/2008 |
| CN | 101411110 A | 4/2009 |
| WO | 2007/112371 A1 | 10/2007 |
| WO | 2008/077353 | 7/2008 |

OTHER PUBLICATIONS

International Search Report fpr PCT/CN2009/071608, mailed Feb. 4, 2010.
Written Opinion of the International Searching Authority mailed Feb. 4, 2010 issued in corresponding International Patent Application No. PCT/CN2009/071608.
Extended European Search Report dated Mar. 20, 2012 issued in corresponding European Patent Application No. 09843885.6.

(Continued)

*Primary Examiner* — Ajibola Akinyemi
(74) *Attorney, Agent, or Firm* — Staas & Halsey LLP

(57) ABSTRACT

A method for reporting channel state information includes: obtaining channel state information of a described object; and feeding back the obtained channel state information to a base station in a comb manner. A method for channel estimation includes: receiving channel state information that is reported by a terminal in a comb manner; and determining, according to the channel state information that is reported in the comb manner, channel state information corresponding to a described object that does not report channel state information.

12 Claims, 5 Drawing Sheets

(56) References Cited

OTHER PUBLICATIONS

T.E. Kolding et al., "Low-Bandwidth Channel Quality Indication for OFDMA Frequency Domain Packet Scheduling", IEEE 3$^{rd}$ International Symposium on Wireless Communication Systems, 2006, pp. 282-286.
Huawei, "TP on Uplink Reference Signals Structure", 3GPP TSG RAN WG1 Meeting #44, Feb. 2006, pp. 1-3.
3GPP TS 36.211 V.8.6.0, "3$^{rd}$ Generation Partnership Project; Technical Specification Group Radio Access Network; Evolved Universal Terrestrial Radio Access (E-UTRA); Physical Channels and Modulation", Release 8, Mar. 2009, pp. 1-83.
3GPP TS 36.213 V.8.6.0, "3$^{rd}$ Generation Partnership Project; Technical Specification Group Radio Access Network; Evolved Universal Terrestrial Radio Access (E-UTRA); Physical layer procedures", Release 8, Mar. 2009, pp. 1-80.
First Chinese Office Action issued Oct. 10, 2012 in corresponding Chinese Patent Application No. 200980124917.X.
European Office Action issued Nov. 8, 2012 in corresponding European Patent Application No. 09843885.6.
Second Office Action, dated Jun. 24, 2013, in corresponding Chinese Application No. 200980124917.X (7 pp.).
Chinese Search Report dated Dec. 23, 2013 in corresponding Chinese Patent Application No. 200980124917 (2 pages).
3$^{rd}$ Chinese Office Action dated Dec. 31, 2013 in corresponding Chinese Patent Application No. 200980124917 (3 pages).

\* cited by examiner

METHOD FOR REPORTING CHANNEL STATE INFORMATION, METHOD FOR CHANNEL ESTIMATION, TERMINAL DEVICE, AND BASE STATION

CROSS-REFERENCE TO RELATED APPLICATIONS

This application is a continuation of International Application No. PCT/CN2009/071608, filed on Apr. 30, 2009, which is hereby incorporated by reference in this entirety.

FIELD OF THE INVENTION

The present invention relates to the field of telecommunication technologies, and in particular to a method for reporting channel state information, a method for channel estimation, a terminal device, and a base station.

BACKGROUND OF THE INVENTION

To achieve a high user throughput, coordinated multi-point transmission technology may be used in a communication system.

The coordinated multi-point transmission technology means that multiple access points (Access Point) that are geologically separate provide data transmission services for one or more users at the same time.

For the coordinated multi-point transmission technology, before coordinated multi-point transmission or receiving, selection of the access point/set and scheduling of the time frequency resources used for transmission must be performed. The base station needs to use the channel state information (Channel State Information, CSI) between the terminal and the candidate access point/set as an input or reference to complete the selection of the access point/set and scheduling of the time frequency resources used for transmission.

In a traditional single-point transmission system, the method for downlink channel measurement is as follows: The serving base station transmits the downlink reference signal. The terminal receives the reference signal. The terminal obtains the channel state information through calculation, and then feeds back the channel state information between the terminal and its serving point (single point). For a multi-point transmission system, the preceding operations also need to be performed. The difference is as follows: in multi-point transmission, multiple base stations send downlink reference signals. The terminal needs to receive reference signals from multiple base stations, and feeds back the channel state information between the terminal and multiple serving points. Therefore, for a multi-point communication system, the feedback quantity of the terminal extends from the channel state information between the terminal and a single point to the channel state information between the terminal and multiple points. For a carrier aggregation system, the channel state information on different component carriers needs to be fed back.

In the prior art, for a coordinated multi-point transmission system, the terminal needs to feed back the channel state information between the terminal and all possible serving points or sets; for a carrier aggregation system, the terminal needs to feed back the channel state information between all possible component carriers of the terminal and the serving points. Therefore, in a coordinated multi-point transmission system or a carrier aggregation system, the feedback quantity increases greatly, and occupies huge uplink channel bandwidth, which causes heavy load on the uplink control channel and reduces the spectral efficiency of the entire system.

SUMMARY OF THE INVENTION

A method for reporting channel state information, method for channel estimation, terminal device, and base station provided in embodiments of the present invention may reduce the occupation of uplink channel bandwidth by channel state information reporting, and improve the spectral efficiency of the system.

A method for reporting channel state information is provided in an embodiment of the present invention, including:
obtaining channel state information of a described object; and
feeding back the obtained channel state information to a base station in a comb manner.

A method for reporting channel state information is provided in an embodiment of the present invention, including:
determining a channel state information feedback cycle of a described object according to an importance parameter of the described object; and
feeding back a channel state parameter of the described object to a base station according to the feedback cycle.

A method for channel estimation is provided in an embodiment of the present invention, including:
receiving channel state information that is reported by a terminal in a comb manner; and
determining, according to the channel state information that is reported in the comb manner, channel state information corresponding to a described object that does not report channel state information.

A method for channel estimation is provided in an embodiment of the present invention, including:
determining, by a base station, a channel state information feedback cycle of a described object according to an importance parameter of the described object; and
delivering, by the base station, the feedback cycle to a terminal, and receiving a channel state parameter fed back by the terminal according to the delivered cycle.

A terminal device is provided in an embodiment of the present invention, including:
an obtaining unit, configured to obtain channel state information of a described object; and
a channel state information reporting unit, configured to feed back the channel state information to the base station in the comb manner.

A terminal device is provided in an embodiment of the present invention. The terminal device includes:
a feedback cycle calculating unit, configured to determine a channel state information feedback cycle of a described object according to an importance parameter of the described object; and
a reporting unit, configured to feed back a channel state parameter of the described object in a collection to the base station according to the feedback cycle obtained through calculation by the feedback cycle calculating unit.

A base station is provided in an embodiment of the present invention, including:
a receiving unit, configured to receive channel state information that is reported by a terminal in a comb manner; and
a calculating unit, configured to calculate, according to every two or more neighboring pieces of channel state information among the channel state information that is reported in the comb manner, channel state information corresponding to a described object that does not report channel state information.

In the embodiments of the present invention, the comb manner is used for reporting channel state information, which reduces the feedback volume of channel state information. Therefore, the occupation of uplink bandwidth by channel state information reporting is reduced, the overhead brought by CSI feedback is effectively decreased, and thereby the frequency efficiency of the system is improved.

DETAILED DESCRIPTION OF THE EMBODIMENTS

Technical solutions of the present invention are described clearly and completely in the following with reference to accompanying drawings. Evidently, the described embodiments are merely some rather than all embodiments of the present invention. Other embodiments derived by those skilled in the art based on the embodiments of the present invention without any creative effort, shall all fall within the protection scope of the present invention.

A method for reporting channel state information and a method for channel estimation are provided in the embodiments of the present invention. In addition, a corresponding terminal device and base station are provided in the embodiments of the present invention. The methods and devices are described in the following in detail.

Embodiment 1

Figure 1:
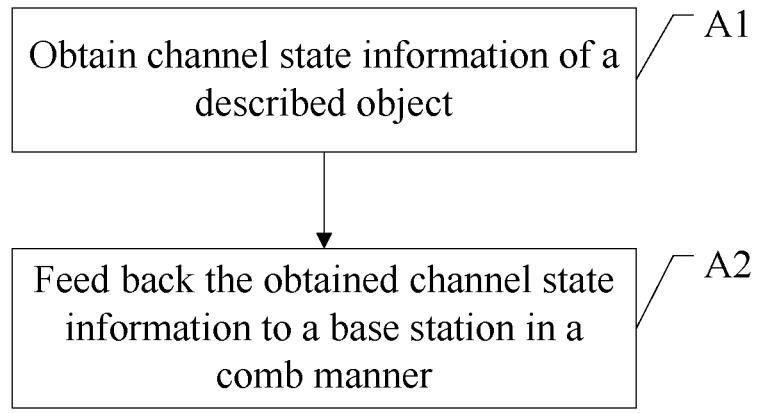
FIG. 1 is a flowchart of a method for reporting channel state information according to embodiment 1 of the present invention.

A method for reporting channel state information, as shown in FIG. 1, includes:

A1: Obtain Channel State Information of a Described Object.

In the embodiment of the present invention, the process of obtaining the channel state information may be implemented in a conventional implementation manner. Generally, a base station may specify a type of the channel state information reported by a terminal. That is, before obtaining the channel state information of the described object, the method includes:

receiving a command that is delivered by the base station and requests a terminal to feed back the SCI, wherein the command includes a type of a described object of the channel state information to be fed back; and the obtaining the channel state information of the described object includes: obtaining the channel state information of the corresponding described object according to the type.

In the embodiment of the present invention, the delivered command for obtaining the channel state information (Channel State Information) may be a reference signal delivered by the base station. After receiving the downlink reference signal delivered by the base station, the terminal may calculate the channel state information according to the downlink reference signal. The channel state information may include one or more of an analog channel matrix element, a channel quality indicator (Channel Quality Indicator, CQI), a pre-coding matrix indicator, and a rank indicator. The object type described by the channel state information may be a sub-bands (sub-bands) type, a bandwidth part (bandwidth part, BP) type, an antenna ports (antenna ports) type, a cooperating cells (cooperating cells) type, or a component carriers (component carriers) type.

A2: Feed Back the Obtained Channel State Information to a Base Station in a Comb Manner.

The comb manner in this embodiment means that during channel state information reporting, according to the numbering sequence for the described objects, the channel state information of the described object corresponding to a current number is reported at a set interval of numbers.

The set number interval may be notified by the base station or set by the terminal, for example, determined by the terminal according to the channel state. If the interval of numbers is set by the terminal, the terminal notifies the set number interval to the base station.

The number interval may be set according to the group where the terminal is located. Multiple terminals on the network are classified into one group. Terminals in each group use the set number interval to perform comb reporting.

The number interval may be followed by the base station and terminal, and preset in the terminal. The number interval in this embodiment of the present invention is also known as comb interval.

Figure 2:
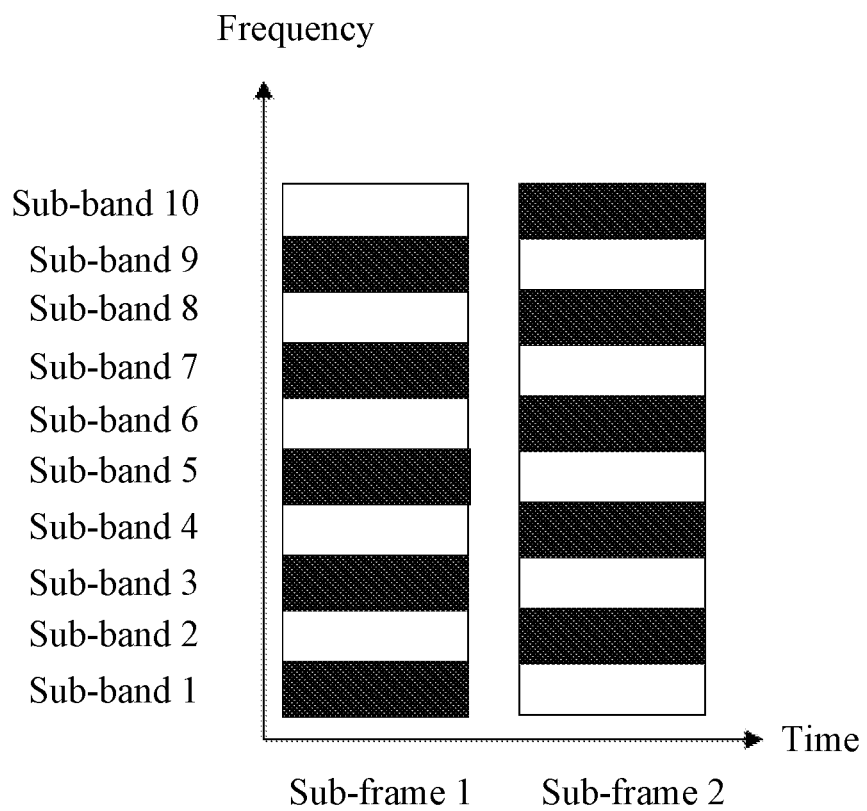
FIG. 2 is a schematic diagram of reporting channel state information in a comb manner according to embodiment 1 of the present invention.

Several examples are provided herein as follows:

FIG. 2 is a schematic diagram of reporting channel state information in a comb manner according to embodiment 1. A sub-band is used as a described object. Ten sub-bands are provided. The cycle of reporting channel state information by the terminal to the base station is a sub-frame. In sub-frame 1, channel state information of sub-bands 1, 3, 5, 7, and 9 is reported. In sub-frame 2, channel state information of sub-bands 2, 4, 6, 8, and 10 is reported. In FIG. 2, the sub-bands that report channel state information are marked in black. In FIG. 2, every other sub-band is numbered and the channel state information of the sub-band with the current number is reported. The interval for reporting channel state information may be adjusted, for example, to three sub-number numbers. In this case, in sub-frame 1, the channel state information of sub-bands 1, 5, 9 . . . is fed back; in sub-frame 2, the channel state information of sub-bands 2, 6, 10 . . . is fed back; in sub-frame 3, the channel state information of sub-bands 3, 7, 11 . . . is fed back; in sub-frame 4, the channel state information of sub-bands 4, 8, 12 . . . is fed back.

After the channel state information is reported, the base station use the interpolation method (for example, linear interpolation and quadratic interpolation) to calculate, according to neighboring channel state information, channel state information of the sub-bands which is not reported and is between the neighboring channel state information. To improve the fairness of reporting by sub-bands in the entire frequency band in comb reporting, the channel state information of different sub-bands may be reported in each reporting cycle. That is, in the next reporting instance, channel state information of the described object that does not report channel state information to the base station is reported according to the numbering sequence of the described objects. As a result, in a period, the channel state information of all sub-bands may be reported. For example, in FIG. 2, in the first reporting cycle (sub-frame 1), channel state information of sub-bands 1, 3, 5, 7, and 9 is reported; in the next reporting cycle (sub-frame 2), channel state information of sub-bands 2, 4, 6, 8, and 10 is reported.

The comb reporting in this embodiment is illustrated in a common description manner as follows.

The comb interval in this embodiment is represented by $I_{comb}$. The specific steps are as follows:

feeding back channel state information on sub-bands/BP/antenna ports/cooperating cells/component carriers the numbers of which are k, k+$I_{comb}$, k+2*$I_{comb}$, and k+3*$I_{comb}$ in sub-frame t;

feeding back channel state information on sub-bands/BP/antenna ports/cooperating cells/component carriers the numbers of which are k+1, k+$I_{comb}$+1, k+2*$I_{comb}$+1, and k+3*$I_{comb}$+1 in sub-frame t+1; and feeding back channel state information on sub-bands/BP/antenna ports/cooperating cells/component carriers the numbers of which are k+$I_{comb}$−1, k+$I_{comb}$+$I_{comb}$−1, k+2*$I_{comb}$+$I_{comb}$−1, and k+3*$I_{comb}$+$I_{comb}$−1 in sub-frame t+$I_{comb}$−1.

The preceding steps are performed through analogy in sequence until the channel state information of all sub-bands/BP/antenna ports/cooperating cells/component carriers is fed back to the base station.

According to the reporting manner in this example, the reporting instance (Reporting Instance) for the CSI of each described object is when $n_f$ and $n_s$ meet the following formula:

$$(10 \times n_f \lfloor n_s/2 \rfloor - N_{OFFSET,CSI}) \bmod (N_P \times I_{comb}) = 0$$

Where, $n_f$ indicates the system frame (frame) number;

$n_s$ indicates a slot (slot) index number in a frame (frame). Its values include 1, 2, 3, . . . 19.

$N_{OFFSET,CSI}$ indicates the offset of the CSI reporting instance in a frame where a unit of the offset (offset) is a sub-frame. $N_P \times I_{comb}$ is the reporting cycle of a described object, where a unit of the reporting cycle is a sub-frame. That is, the CSI of the described object is reported once every $N_P \times I_{comb}$ sub-frames.

$I_{comb}$ indicates the comb interval for reporting channel state information of a described object in a comb manner. $N_P$ indicates the reporting cycle for reporting channel description information by a described object in the prior art. Different from the embodiment of the present invention, for a described object, the channel state information of the described object is reported at each reporting instance in the prior art. In the embodiment of the present invention, the sub-frame where the channel state information of each described object is reported may be obtained through calculation according to the preceding formula. In addition, based on the fairness principle, in a certain period, the channel state information of each described object may be reported once, so that the reporting quality is ensured while the channel feedback quantity is reduced.

In the embodiment of the present invention, the channel state information (CSI) may include multiple types of information. Which may generally include: the CSI may includes: at least one of the analog channel matrix element, channel quality indicator, precoding matrix indicator, and rank indicator.

The analog channel matrix element is an analog feedback quantity. A matrix element is a complex value a+bj, where a and b are real numbers. The channel state information may be fed back in the form of feeding back a and b, or in the form of feeding back the module and phase of a complex number. Or, the feedback is performed after the complex number is converted into other forms, for example, into a logarithm.

The channel quality indicator (Channel Quality Indicator, CQI), rank indicator (Rank Indicator, RI), and precoding matrix indicator (Precoding matrix Indicator, PMI) are digital feedback quantity.

Further, in this embodiment, the following may be further included: receiving a feedback manner identifier delivered by the base station, where the feedback manner identifier is used to indicate the channel state information reporting manner of the terminal.

If the feedback identifier indicates comb feedback, the channel state information of the preceding type continues to be fed back to the base station in the comb manner.

The feedback manner identifier may be carried in the command for obtaining channel state information, where the command is delivered by the base station, to the terminal; or may be delivered by the base station through other messages or a new message to the terminal The specific delivering manner does not confine the present invention.

The base station may instructs the terminal to perform feedback in other forms, for example, feedback in a regular manner, or in the manner of feedback in different cycles as described in embodiment 2.

The channel state information reporting form may be selected by the terminal side. For example, when the terminal enters the cooperating multi-point transmit mode, reporting in the comb manner is triggered. As another example, if the base station determines that the number of cooperating cells of the terminal determined by the base station exceeds a certain preset threshold, the event is notified to the terminal, and then the terminal selects a reporting manner.

In embodiment 1 of the present invention, the channel state information is reported by using the comb manner, which reduces the feedback quantity of the channel state information. The occupation of uplink bandwidth resources by channel state information reporting is reduced, and the overhead brought by CSI feedback is effectively decreased. In addition, by using the linear interpolation or other interpolation methods, channel state information of the described object that does not report the channel state information may be obtained through calculation, which improves the frequency efficiency of the system.

Embodiment 2

Figure 3:
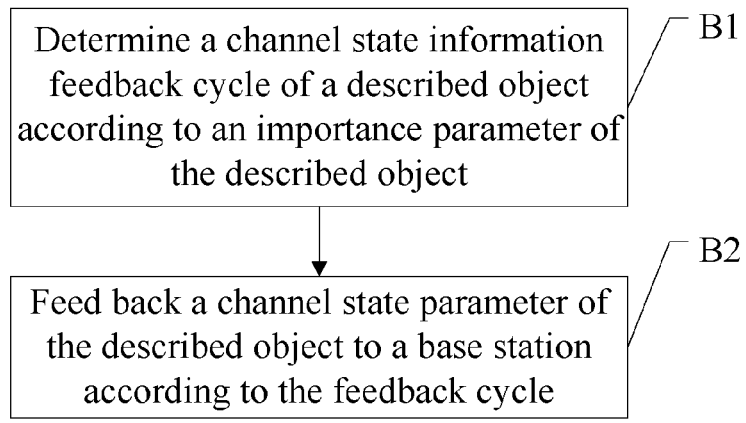
FIG. 3 is a flowchart of a method for reporting channel state information according to embodiment 2 of the present invention.

A method for reporting channel state information, the process of which is as shown in FIG. 3, includes:

B1: Determine a Channel State Information Feedback Cycle of a Described Object According to an Importance Parameter of the Described Object.

Generally, a base station may specify the type of the described object corresponding to the channel state information fed back by a terminal. Specifically, the command delivered by the base station for requesting the terminal to feed back the channel state information includes the type of the described object of the channel state information to be fed back. The type of the described object of the state information is a sub-bands type, a bandwidth part type, an antenna ports type, a cooperating cells type, or a component carriers type.

After knowing the type of the described object, the terminal obtains a described object collection corresponding to the described object types. In this embodiment, the described object collection is the collection of objects serving the terminal at the same time, for example, cooperating cells that serve the terminal at the same time and antenna ports that serve the terminal at the same time.

The process of determining the channel state information feedback cycle of each described object may be obtaining through calculation merely according to the importance parameter; or combining at the same time with the comparison of values of the importance parameters of the described objects, and then determining the reporting cycle of each described object according to the comparison result.

In the embodiment of the present invention, the feedback cycle of the channel state information of the described objects may be determined by the terminal or the base station.

The determination manner of the base station: determine the channel state information feedback cycle of the described objects according to the importance parameter of the described object; and after the feedback cycle is determined, the base station delivers the feedback cycle to the terminal.

In the embodiment of the present invention, for different types of described objects, the important parameters may vary. For example:

If the described object is a sub-band, the importance parameter is channel state information of the sub-band;

If the described object is a bandwidth part, the importance parameter is channel state information of the sub-band on the bandwidth part;

If the described object is an antenna port, the importance parameter is the power of the antenna port in the base station;

If the described object is a cooperating cell, the importance parameter is the large-scale attenuation value between the terminal and the cooperating cell; and If the described object is a component carrier, the importance parameter is the large-scale attenuation value on the component carrier between the terminal and the cooperating cell.

B2: Feed Back a Channel State Parameter of the Described Object to the Base Station According to the Feedback Cycle.

Figure 4:
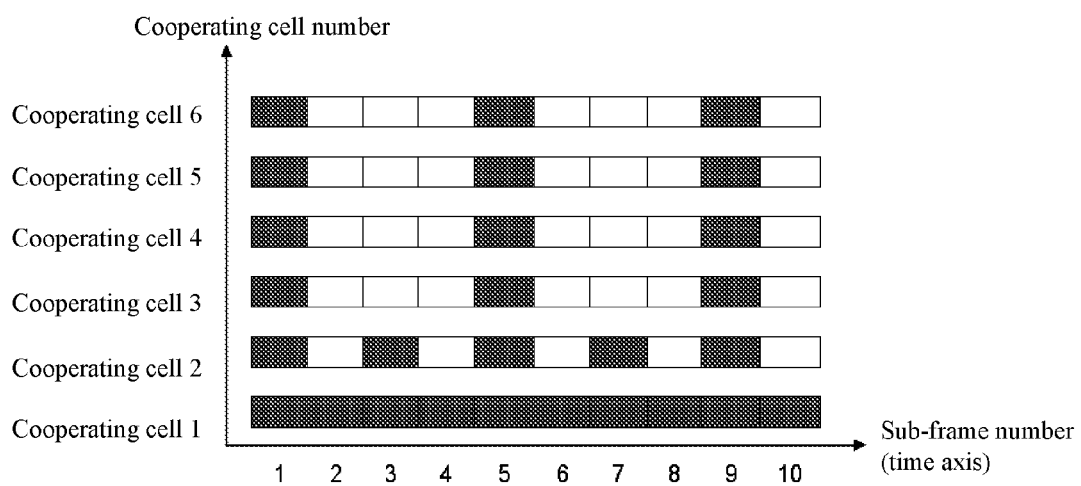
FIG. 4 is a flowchart of a method for reporting channel state information in multiple cooperating cells according to embodiment 2 of the present invention.

In the following, the example that the described object is a cooperating cell is used for illustration. As shown in FIG. 4, in a coordinated multi-point transmission system, terminal 1 has 6 cooperating cells, that is, 6 cells transmit data for terminal 1 at the same time. Feedback cycles of CSI of different cooperating cells, where the CSI is fed back by terminal 1 according to different cycles, are determined according to large-scale attenuation values between terminal 1 and cooperating cells. The feedback cycles of different cooperating cells may be different. Generally, the greater the large-scale attenuation value is, the longer the feedback cycle is. For example, the large-scale attenuation between cooperating cell 1 and terminal 1 is the smallest, and the feedback cycle is set to one sub-frame. The large-scale attenuation between cooperating cell 2 and terminal 1 is the second smallest, and the feedback cycle is set to two sub-frames. The feedback cycles of other cooperating cells 3 to 6 are set to four sub-frames.

In embodiment 2 of the present invention, the feedback cycle of each described object in the described object collection is processed separately according to the importance of the described objects of the reported channel state information. In this way, a fast feedback cycle may be used for described objects with high importance, and a slow feedback cycle is used for described objects with low importance.

Compared with the use of a unified feedback cycle in the prior art, the occupation of uplink bandwidth resources is reduced as much as possible, the overhead brought by CSI feedback is effectively decreased, and thereby the frequency efficiency of the system is improved, while it is ensured that important data is uploaded.

The method for reporting in different cycles according to embodiment 2 of the present invention may be triggered by the base station or the terminal.

For base station triggering, the feedback manner identifier may be carried in the command delivered by the base station. If the feedback manner identifier indicates perform feedback in different cycles, step B1 is continued.

For terminal triggering, when the terminal enters a coordinated multi-point transmission mode, reporting in different cycles is triggered. Or, when receiving information that is delivered by the base station and indicates that the number of cooperating cells for the terminal exceeds a preset threshold, the terminal selects a reporting manner (reporting in different cycles or comb reporting in embodiment 1) according to its own condition.

Embodiment 3

Figure 5:
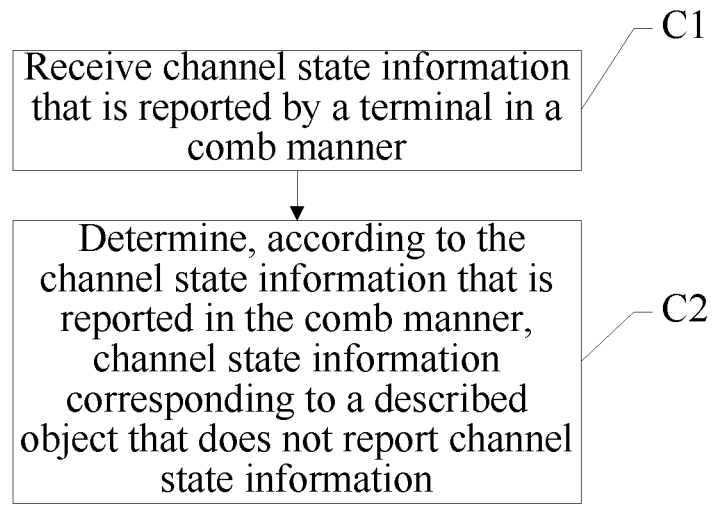
FIG. 5 is a flowchart of a method for channel estimation according to embodiment 3 of the present invention.

A method for channel estimation, the process of which is as shown in FIG. 5, includes:

C1: Receive Channel State Information that is Reported by a Terminal in a Comb Manner.

The channel state information includes at least one of the analog channel matrix element, channel quality indicator, precoding matrix indicator, and rank indicator. The type of described objects of channel state information is a sub-bands type, a bandwidth part type, an antenna ports type, a cooperating cells type, or a component carriers type.

The channel state information fed back in the comb manner is the channel state information that is corresponding to the described object of a current number and reported by the terminal at a set interval of described object numbers according to the numbering sequence of the described objects. For detailed description, reference is made to description in embodiment 1.

C2: Determine, According to the Channel State Information that is Reported in the Comb Manner, Channel State Information Corresponding to a Described Object that does not Report Channel State Information.

Interpolation calculation is performed on every two neighboring pieces of channel state information to obtain the channel state information that is corresponding to the described object that does not report channel state information and is between the two neighboring pieces of channel state information.

The specific calculation manner may be performing linear interpolation calculation or interpolation calculation of other types on every two or more neighboring pieces of channel state information to obtain the channel state information corresponding to the described object that does not report channel state information.

A simple linear interpolation scheme is the arithmetic mean. For example, in the example of embodiment 1, the channel state information of sub-bands 1 and 3 is reported by the terminal, and the channel state information of sub-band 2 may be estimated from the channel state information of sub-bands 1 and 3.

channel state information of sub-band 2=(channel state information of sub-band 1+channel state information of sub-band 3)/2

The purpose of the base station obtaining the channel state information of all sub-bands is to facilitate scheduling of the base station, that is, to allocate sub-bands to proper terminals according to the channel state information.

Embodiment 3 of the present invention is the processing by the base station side in the case that the terminal reports channel state information in the comb manner. The base station obtains, through interpolation calculation, channel state information that is not reported, to achieve the purpose of scheduling resources and provide technical support on the base station side for the channel state information reporting method provided in embodiment 1. As a result, the occupation of uplink bandwidth resources is reduced as much as possible, the overhead brought by CSI feedback is effectively decreased, and thereby the frequency efficiency of the system, while it is ensured that important data is uploaded. An application example of the method in embodiment 1 is provided as follows:

In this example, for the comb feedback reporting mode in the present invention, the comb interval $I_{comb}$ is set. A unit of the comb interval is a BP herein. The CSI on a certain sub-band in the current BP is reported at an interval of $I_{comb}$ BPs. If the base station sets $I_{comb}$ to 2 BPs, CSI reporting is not performed in the BPs between the reporting comb BPs. Therefore, if each BP includes multiple sub-bands, the sub-band that reports CSI on each BP needs to be specified. The specifying manners are many, which may be setting by the terminal, or that the base station delivers the specification rules. For the specific implementation, the bitmap (Bitmap) may be used to specify the sub-band that needs to report CSI on each BP. The Bitmap may be delivered by the base station or set by the terminal. The specific specifying manner does not confine the present invention.

It is understandable to those skilled in the art that all or part of the steps in the preceding embodiments may be completed through a program instructing hardware. The program may be stored in a computer-readable storage medium, where the computer-readable storage medium may include an ROM, an RAM, a magnetic disk, or an optical disk.

Embodiment 4

Figure 6:
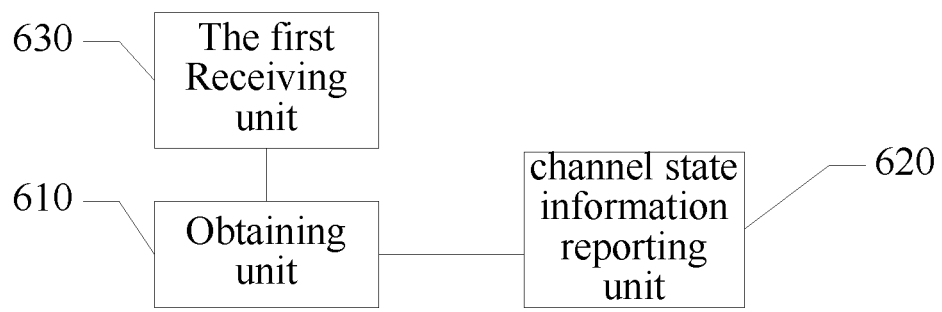
FIG. 6 is a schematic structural diagram of a terminal device according to embodiment 4 of the present invention.

A terminal device, a schematic structural diagram of which is as shown in FIG. 6, includes:

an obtaining unit 610, configured to obtain channel state information of a described object; and a channel state information reporting unit 620, configured to feed back the channel state information to the base station in the comb manner.

It is understandable that the terminal device in this embodiment may further include: a first receiving unit 630, configured to receive a command for obtaining the channel state information, where the command is delivered by the base station and includes a type of a described object of the channel state information to be fed back; and the obtaining unit 610 is configured to obtain channel state information of the described object of the type.

Figure 7:
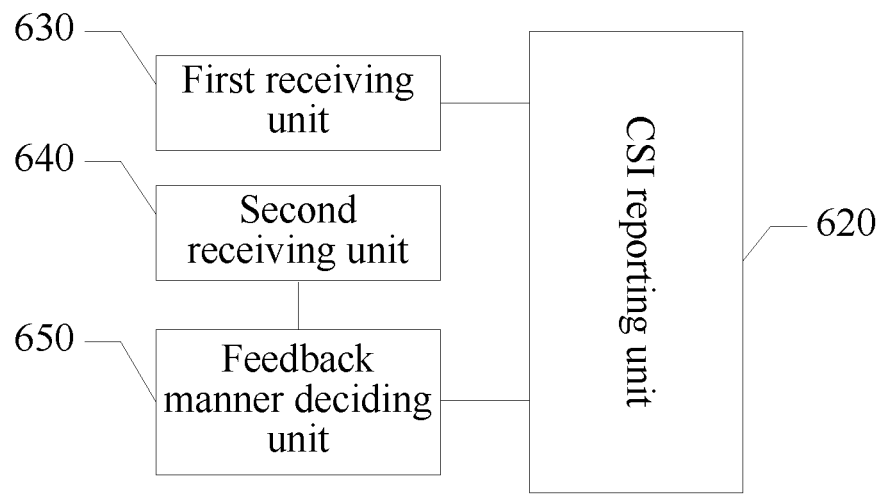
FIG. 7 is another schematic structural diagram of a terminal device according to embodiment 4 of the present invention.

As shown in FIG. 7, the channel state information reporting unit is specifically configured to report, according to the numbering sequence of described objects, the channel state information corresponding to the described object of a current number at a set interval of numbers, when the reporting instance is reached.

The terminal device in this embodiment may further include: a second receiving unit 640, configured to receive a feedback manner identifier delivered by the base station, where the feedback manner identifier is used to indicate the channel state information reporting manner of the terminal.

As shown in FIG. 7, the terminal device may further include: a feedback manner deciding unit 650, configured to judge the channel state information feedback manner according to the feedback manner identifier received by the second receiving unit 640, and if the feedback manner identifier indicates comb feedback, notify the channel state information reporting unit 620 of reporting the channel state information of the type to the base station in the comb manner.

The terminal device provided in embodiment 4 of the present invention uses the comb manner to report the channel state information, reducing the feedback quantity of the channel state information fed back by the terminal to the base station. In addition, the occupation of uplink bandwidth resources by channel state information reporting is reduced, the overhead brought by CSI feedback is effectively decreased, and thereby the frequency efficiency of the system is improved.

Embodiment 5

Figure 8:
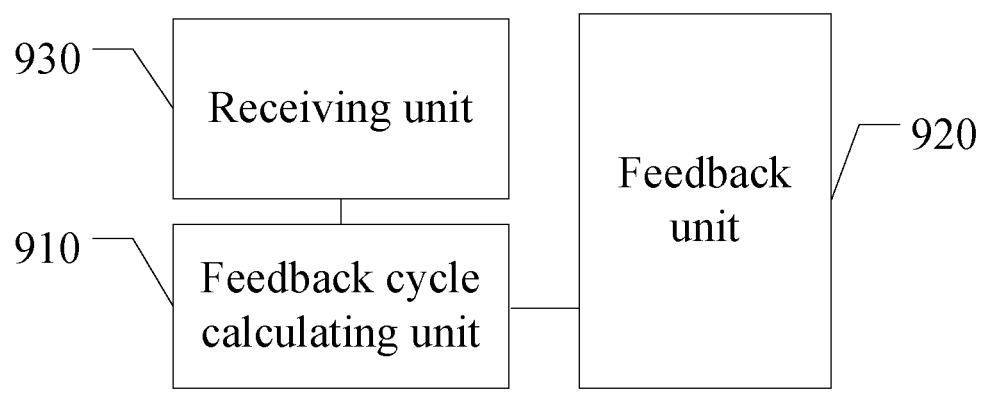
FIG. 8 is a schematic structural diagram of a terminal device according to embodiment 5 of the present invention.

A terminal device, a schematic structural diagram of which is as shown in FIG. 8, includes:

a feedback cycle calculating unit 910, configured to determine a channel state information feedback cycle of a described object according to an importance parameter of the described object; and a feedback unit 920, configured to feed back a channel state parameter of the described object in a collection to the base station according to the feedback cycle determined by the feedback cycle calculating unit 910.

It is understandable that the terminal device in this embodiment may further include:

a receiving unit 930, configured to receive a command for obtaining the channel state information, wherein the command is delivered by the base station and includes a type of a described object of the channel state information to be reported.

The feedback cycle calculating unit 910 is specifically configured to determine the channel state information feedback cycle of the described object of the type.

The terminal device provided in embodiment 5 of the present invention, processes separately the feedback cycle of each described object according to the importance of the described objects of the reported channel state information. As a result, a fast feedback cycle may be used for a described object with high importance, and a slow feedback cycle may be used for a described object with low importance. Compared with the use of a unified feedback cycle in the prior art, the occupation of uplink bandwidth resources is reduced as much as possible, the overhead brought by CSI feedback is effectively decreased, and thereby the frequency efficiency of the system is improved, while it is ensured that important data is uploaded.

Embodiment 6

Figure 9:
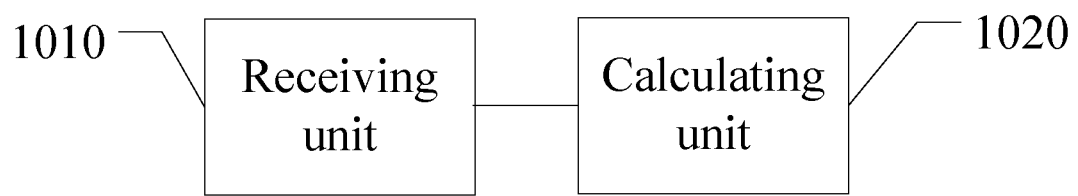
FIG. 9 is a schematic structural diagram of a terminal device according to embodiment 6 of the present invention.

A base station, a schematic structural diagram of which is as shown in FIG. 9, includes:

a receiving unit 1010, configured to receive channel state information that is reported by a terminal in a comb manner; and a calculating unit 1020, configured to determine, according to the channel state information that is reported in the comb manner, channel state information corresponding to a described object that does not report channel state information.

Embodiment 3 of the present invention shows the processing by the base station side in the case that the terminal reports the channel state information in the comb manner. The base station determines, according to the channel state information that is reported in the comb manner, the channel state information corresponding to the described object that does not report channel state information, to achieve the purpose for scheduling resources. Through cooperation with the terminal provided in embodiment 4, the occupation of uplink bandwidth resources is reduced as much as possible, the overhead brought by CSI feedback is efficiently decreased, and thereby the frequency efficiency of the system is improved, while it is ensured that important data is uploaded.

For the method available to the terminal and base station provided in the embodiment of the present invention, reference may be made to the preceding description of the multiple method embodiments. The method for reporting channel state information, terminal device, and base station provided in the embodiments of the present invention may apply to the Long Term Evolution (Long Term Evolution, LTE) system, Orthogonal Frequency Division Multiplexing (Orthogonal Frequency Division Multiplexing, OFDM) system, Code-Division Multiple Access (Code-Division Multiple Access, CDMA) system, Time Division Multiple Access (Time Division Multiple Access, TDMA) system, and other mobile communication systems.

The method for reporting channel state information, method for channel estimation, terminal device, and base station provided in the embodiments of the present invention are introduced above in detail. Several specific examples are used for illustration of the principles and implementation manners of the present invention. The illustration of the preceding embodiments is merely used to facilitate the understanding of the methods and the core ideas of the present invention. Those skilled in the art may make modifications and variations to the specific implementation manner and application scope of the present invention according to the ideas of the present invention. Therefore, the content of this specification shall not be construed as a limitation to the present invention.

What is claimed is:

1. A method for reporting channel state information, comprising:
   receiving a command request to a terminal to feed back a channel state information, wherein the command is delivered by a base station and comprises a type of a described object of the channel state information to be fed back;
   obtaining the channel state information of the described object according to the type of the described object;
   receive a feedback manner identifier delivered by the base station, wherein the feedback manner identifier is used to indicate the channel state information reporting manner of the terminal; and
   feeding back the obtained channel state information of the described object to the base station in a comb manner, if the feedback manner identifier indicates comb feedback.

2. The method according to claim 1, wherein, the feeding back the obtained channel state information to the base station in the comb manner comprises:
   when a reporting instance arrives, according to a numbering sequence of the described object, reporting the channel state information of the described object corresponding to a current number at a set interval of numbers, wherein the interval of numbers is notified by the base station, set by the terminal, or set according to a group where the terminal is located.

3. The method according to claim 2, wherein, if the interval of numbers is set by the terminal, the method further comprises: notifying, by the terminal, the set number interval to the base station after setting.

4. The method according to claim 2, the method further comprising: in the next reporting instance, reporting channel state information of a described object that does not report channel state information to the base station according to the numbering sequence of the described objects.

5. The method according to claim 1, wherein types of described objects of the channel state information comprise: a sub-bands type, a bandwidth part type, an antenna ports type, a cooperating cells type, or a component carriers type.

6. A method for reporting channel state information, comprising:
   determining a channel state information feedback cycle of a described object according to an importance parameter of the described object; and
   feeding back a channel state parameter of the described object to a base station according to the feedback cycle;
   if the described object is a sub-band, the importance parameter of the described object is channel state information of the sub-band;
   if the described object is a bandwidth part, the importance parameter of the described object is channel state information of a sub-band on the bandwidth part;
   if the described object is an antenna port, the importance parameter of the described object is a power of the antenna port of the base station;
   if the described object is a cooperating cell, the importance parameter of the described object is a large-scale attenuation value between the terminal and the cooperating cell; and
   if the described object is a component carrier, the importance parameter of the described object is a large-scale attenuation value on the component carrier between the terminal and the cooperating cell.

7. The method according to claim 6, wherein, before determining the channel state information feedback cycle of the described object according to the importance parameter of the described object, the method further comprises:
   receiving a command requesting the channel state information fed back by a terminal, wherein the command is delivered by the base station and includes a type of a described object of the channel state information; and
   determining a described object collection corresponding to the type of the described object, wherein
   the determining the channel state information feedback cycle of the described object comprises:
   determining the channel state information feedback cycle of described objects in the described object collection.

8. A method for channel estimation, comprising:
   receiving channel state information that is reported by a terminal in a comb manner; and
   performing interpolation calculation on two neighboring pieces of channel state information to obtain a channel state information that is corresponding to the described object that does not report channel state information and is between the two neighboring pieces of channel state information according to the channel state information that is reported in the comb manner.

9. A terminal device, comprising:
   a receiver, configured to receive a command for obtaining a channel state information, wherein the command is delivered by a base station and includes a type of a described object of the channel state information to be fed back;

an processor, configured to obtain the channel state information of the described object of the type;

the receiver, configured to receive a feedback manner identifier delivered by the base station, wherein the feedback manner identifier is used to indicate a channel state information reporting manner of the terminal;

the processor configured to judge according to the feedback manner identifier, a manner in which the channel state information feedback is performed and if the feedback manner identifier indicates comb feedback, report the channel state information of the type to the base station in the comb manner.

10. The terminal device according to claim 9, wherein the processor is configured to report, according to the numbering sequence of described objects, the channel state information corresponding to a described object at a set interval of described objects, when a reporting instance is reached.

11. A terminal device, comprising:

a processor, configured to determine a channel state information feedback cycle of a described object according to an importance parameter of the described object; and the processor, configured to feed back a channel state parameter of the described object in a collection to a base station according to the feedback cycle determined;

if the described object is a sub-band, the importance parameter of the described object is channel state information of the sub-band;

if the described object is a bandwidth part, the importance parameter of the described object is channel state information of a sub-band on the bandwidth part;

if the described object is an antenna port, the importance parameter of the described object is a power of the antenna port of the base station;

if the described object is a cooperating cell, the importance parameter of the described object is a large-scale attenuation value between the terminal and the cooperating cell; and if the described object is a component carrier, the importance parameter of the described object is a large-scale attenuation value on the component carrier between the terminal and the cooperating cell.

12. The terminal device according to claim 11, the terminal device further comprising:

a receiver, configured to receive a command for obtaining the channel state information, wherein the command is delivered by the base station and comprises a type of a described object of the channel state information to be reported; and the processor is specifically configured to determine the channel state information feedback cycle of the described object of the type.

* * * * *

UNITED STATES PATENT AND TRADEMARK OFFICE
CERTIFICATE OF CORRECTION

PATENT NO. : 8,731,478 B2  Page 1 of 1
APPLICATION NO. : 13/284296
DATED : May 20, 2014
INVENTOR(S) : Xiaotao Ren et al.

It is certified that error appears in the above-identified patent and that said Letters Patent is hereby corrected as shown below:

On the Title Page, Item [63] (Related U.S. Application Data), Column 1, Line 1:

Delete "PCT/JP/2009/071608" and insert --PCT/CN2009/071608--

Signed and Sealed this
Second Day of June, 2015

Michelle K. Lee
*Director of the United States Patent and Trademark Office*